United States Patent [19]

Molnar

[11] Patent Number: 5,651,569
[45] Date of Patent: Jul. 29, 1997

[54] INFLATABLE BUMPER SYSTEM

[76] Inventor: Steve Molnar, 205 West Rd., Beacon Falls, Conn. 06403

[21] Appl. No.: 544,630

[22] Filed: Oct. 18, 1995

[51] Int. Cl.⁶ .................................................. B60R 19/20
[52] U.S. Cl. ............................ 293/107; 293/121; 293/125; 293/155
[58] Field of Search ............................. 293/107, 108, 293/120–122, 125, 155

[56] References Cited

U.S. PATENT DOCUMENTS

| | | | |
|---|---|---|---|
| 1,560,040 | 11/1925 | Cerf . | |
| 1,724,431 | 8/1929 | Spear | 293/107 |
| 2,089,500 | 8/1937 | Ochadloski | 293/107 |
| 2,829,915 | 4/1958 | Claveau | 293/120 X |
| 2,890,904 | 6/1959 | Materi . | |
| 3,473,836 | 10/1969 | Halter . | |
| 3,656,791 | 4/1972 | Truesdell | 293/1 |
| 3,689,054 | 9/1972 | Gouirand | 267/68 |
| 3,706,468 | 12/1972 | Yoviene | 293/107 |
| 3,764,174 | 10/1973 | Taininecz . | |
| 3,829,141 | 8/1974 | Igwe . | |
| 3,866,962 | 2/1975 | Eshelman | 293/19 |
| 4,070,052 | 1/1978 | Ng | 293/107 |
| 4,381,122 | 4/1983 | Kite | 293/125 |
| 4,869,538 | 9/1989 | Presley | 293/107 |
| 4,930,823 | 6/1990 | Rivera | 293/107 |
| 5,042,859 | 8/1991 | Zhang et al. | 293/107 |

FOREIGN PATENT DOCUMENTS

| | | | |
|---|---|---|---|
| 749320 | 1/1933 | France | 293/107 |
| 1322005 | 2/1963 | France | 293/120 |

*Primary Examiner*—Dennis H. Pedder
*Attorney, Agent, or Firm*—Robert A. Seemann

[57] ABSTRACT

A bumper system adapted to be mounted on a vehicle includes an elongated, inflatable bag fastened by its two ends and by opposed longitudinal ribs to and within a shell having a concave front and a forward facing impact support beam behind the shell spacedly attached to the shell. A rotatable impact energy transfer element is connected to the shell so that it is adjacent to the circumference of a wheel of the vehicle, and the axis of rotation of the transfer element is parallel with the axis of rotation of the wheel of the vehicle.

14 Claims, 6 Drawing Sheets

INFLATABLE BUMPER SYSTEM

BACKGROUND OF THE INVENTION

1. Field of the Invention

The invention pertains to vehicle fenders, more specifically to a vehicle bumper cushioned in several ways by fluid means.

2. Description of the Prior Art

The prior art is replete with patents for air-filled rubber bumpers for vehicles.

For example, U.S. Pat. No. 2,890,904, patented by A. Materi, Jun. 16, 1959, describes a pneumatic rubber tube permanently sealed within a hollow rubber casing which has a plurality of laterally spaced apart, ribbed rubber extensions molded or vulcanized to the body of the casing. Each extension has slots between the ribs to increase overall resiliency of the extension and to permit the extension to be cut with a knife to adjust its length from the casing. Bracket plates welded to posts on the body of the vehicle are flanged to receive the most distant rib of the extension.

U.S. Pat. No. 3,689,054, patented by R. Gouirand, Sep. 5, 1972, describes an air bag air suspension system coupled to an air bag bumper by a slow return air valve. The back of the bumper air bag is attached to a first bumper plate which is coupled to the end of the vehicles chassis. The front of the bumper air bag is attached to a second bumper plate which is pivotally secured to the first bumper plate, the air bag being between the first and second bumper plates.

U.S. Pat. No. 3,829,141 patented by G. Igwe, Aug. 13, 1974, describes an inflated tube attached by bolts to a rigid backing plate on the front of the vehicle. A metal band having a length slightly less than the length of the tube, extends the length of the tube in contact with the front of the tube and has its ends attached to the backing plate so that the band enclosing the pressurized tube prestresses the backing plate so that the structure returns to its original shape after being temporarily distorted by an impact.

SUMMARY OF THE INVENTION

It is one object of the invention to provide a bumper system for many types of road vehicles including passenger cars, light and heavy trucks, school busses, and tractor trailers.

It is another object to provide a bumper system which protects the passenger and the car from damage in a collision.

It is another object that the bumper system reduces or eliminates damage to the body of the vehicle in a collision.

It is another object that the bumper system is not damaged by a collision.

It is another object that the bumper system includes an inflatable element.

It is another object that the inflatable element be replaceable.

It is another object that the bumper system may be made in part with recycled tires.

It is another object that the bumper system is simple to repair and to replace.

It is another object that the bumper system is inexpensive to manufacture.

It is another object that the bumper system is light weight relative to impact absorption capability.

It is another object that the bumper system adds no complex metal machinery to the vehicle in order to provide impact shock absorbing protection.

It is another object that the bumper system may be included in the manufacture of new vehicles, and may replace bumpers on existing vehicles.

It is another object that the bumper system may be used on the fronts and backs of new vehicles and may be adapted for use on the sides of vehicles.

A bumper system adapted to be mounted on a vehicle includes an elongated, inflatable bag, and a shell the first side of which is concave along the length of the shell.

The mid portion of the shell in angled from first and second ends of the shell so that the shell wraps around an end of the vehicle when the mid portion is across an end of the vehicle.

The ends of the bag are solid and include fastener means for attaching the bag to the shell at the two ends of the shell.

An impact support beam is connected to a second side of the shell, extends along the length of the shell, and is spaced from the shell by shell support attachment means which are attached to the shell and adapted to attach the shell to shock absorber bumper support means of a vehicle. The shell support attachment means includes means for attaching the impact support beam to the shell. The shell support attachment means may be essentially the sole support means of supporting the shell on a vehicle.

The first side of the impact support beam is concave and faces toward the second side of the shell.

A rotatable transfer element is connected to the shell so that the axis of rotation of the rotatable transfer element is generally parallel with the axis of rotation of a wheel of the vehicle when the shell is mounted on the vehicle.

The rotatable transfer element is connected to the shell so that the circumference of the rotatable transfer element is adjacent to the circumference of the wheel of the vehicle. It comprises a generally solid tire.

The bag is inflated preferably by a compressible fluid. It includes a pair of longitudinal ribs spaced apart on the bag laterally to the length of the bag. The shell includes channels to hold the ribs. The channels are generally, parallel, radially opposed and radially spaced from each other by a curved wall of the second side of the shell, and are attached to a curved wall of the first side of the shell which extends over and is in contact with a flexible wall of the bag.

BRIEF DESCRIPTION OF THE DRAWINGS

In order that the invention be more fully comprehended, it will now be described, by way of example, with reference to the accompanying drawings, in which.

DESCRIPTION OF THE PREFERRED EMBODIMENTS

Figure 1:
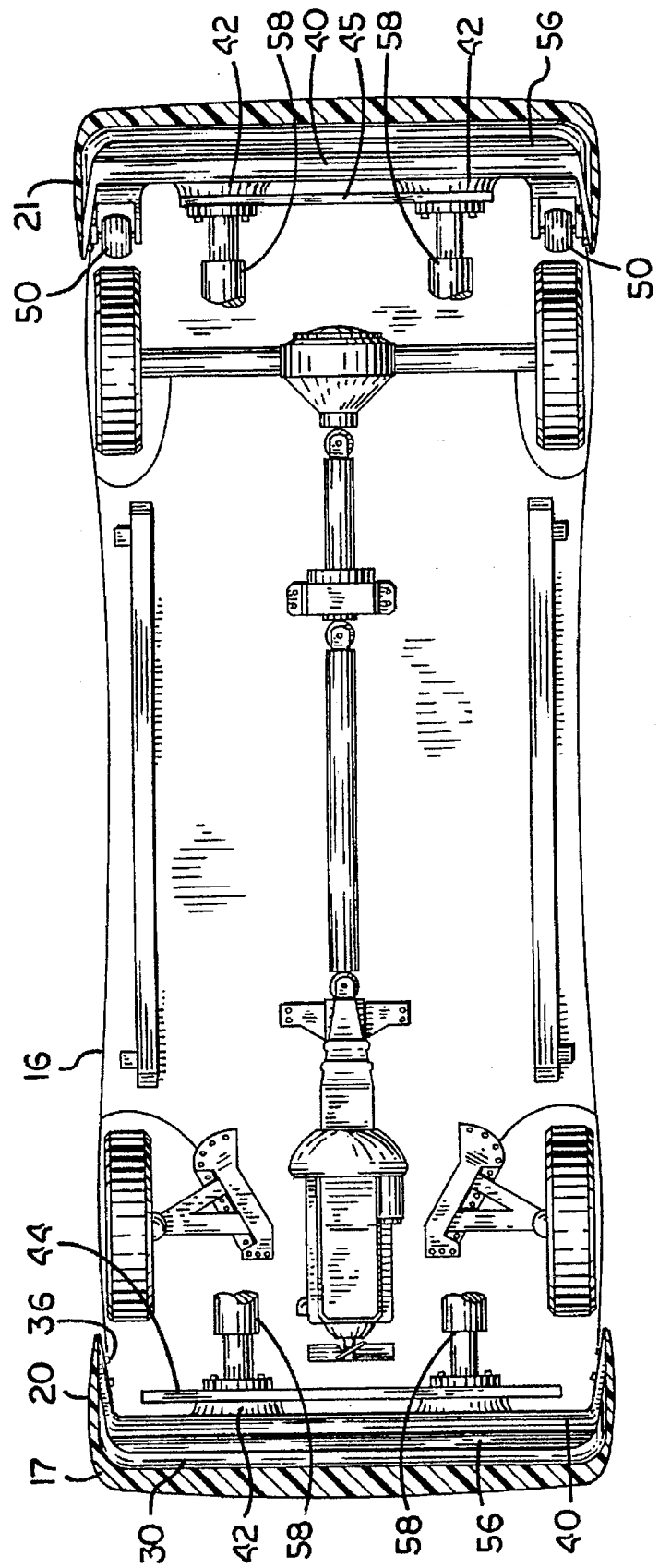
FIG. 1 is a bottom schematic view of a passenger car with the invention installed.
Figure 2:
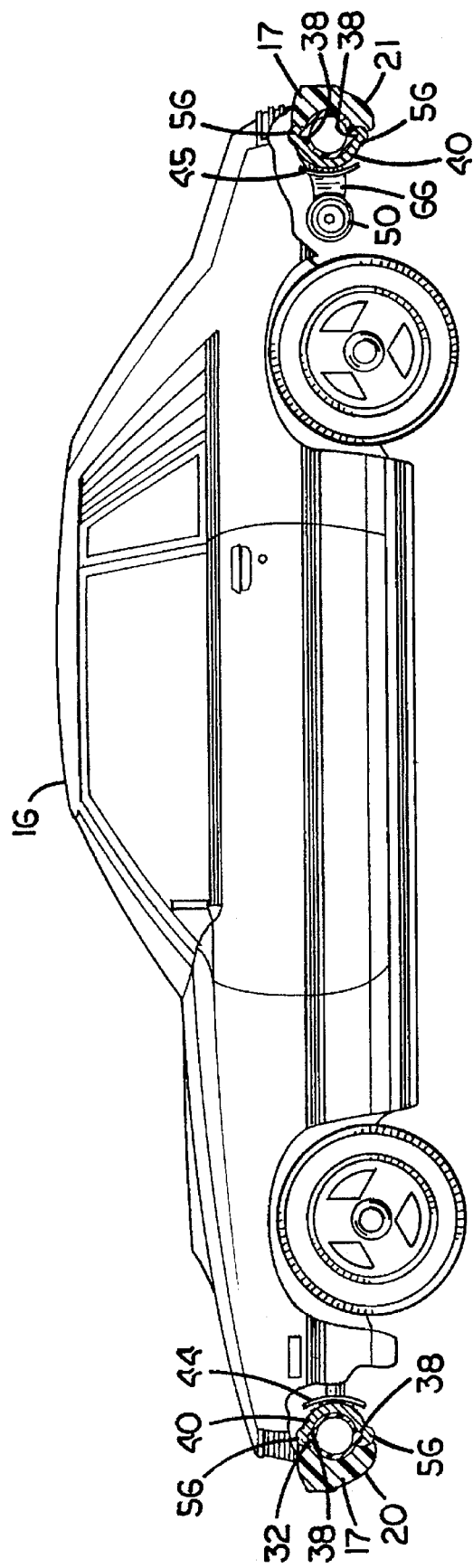
FIG. 2 is a side schematic view of the passenger car of FIG. 1, with the invention installed.

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

Referring to FIGS. 1–6, passenger car 16 includes flexible front and back decorative bumper covers 17 over front bumper system 20 and rear bumper system 21. Cover 17 is shown in cross section, and only in FIGS. 1 and 2.

On each of the front and back bumpers, inflatable bag 30 is held in steel insert shell 40 by a pair of longitudinal ribs 32 which extend into the recesses 38 of longitudinal channels 56 of the shell.

Inflatable bag 30 is pressurized by way of valve 34 so than when the inflatable bag is fully expanded it is locked into the shell by the ribs in the recesses.

Impact support beam 44 is attached to insert shell 40 by bolts 62 in two reinforcement plates 42 in the front bumper system. In the rear bumper system impact support beam 45, which is shorter than impact support beam 44, is attached to insert shell 40 by bolts 70 in two reinforcement plates 42.

The reinforcement plates are designed to bolt to shock absorbers 58 which presently support vehicle bumpers, so that aftermarket replacement of a stock bumper on a vehicle with the invention is a simple matter of unbolting the stock bumpers from the shock absorber and bolting on the invention. Reinforcement plates 42 are welded to insert shell 40, but may be bolted to the shell.

If bolting is used, the inner side of the shell may be recessed to receive the bolt head or a nut so that the head or nut will not damage the inflatable bag.

Figure 6:
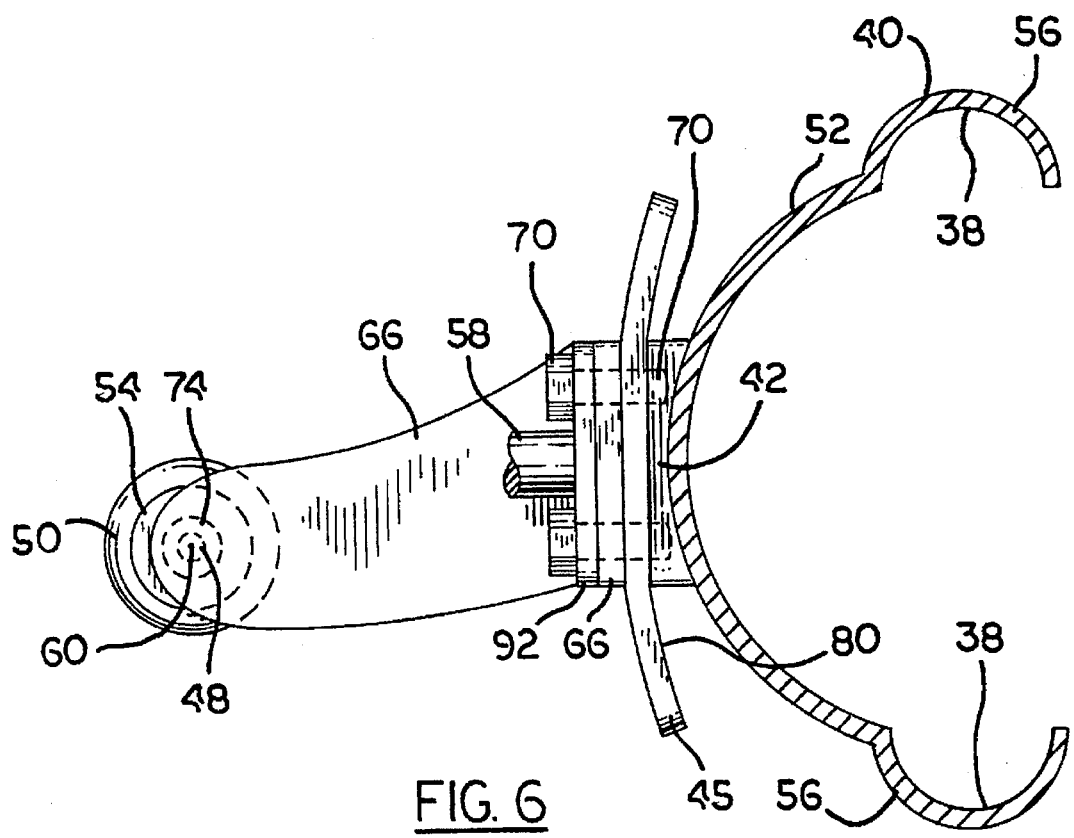
FIG. 6 is a cross section side view of the insert shell of FIG. 5, and an impact support beam.
Figure 7:
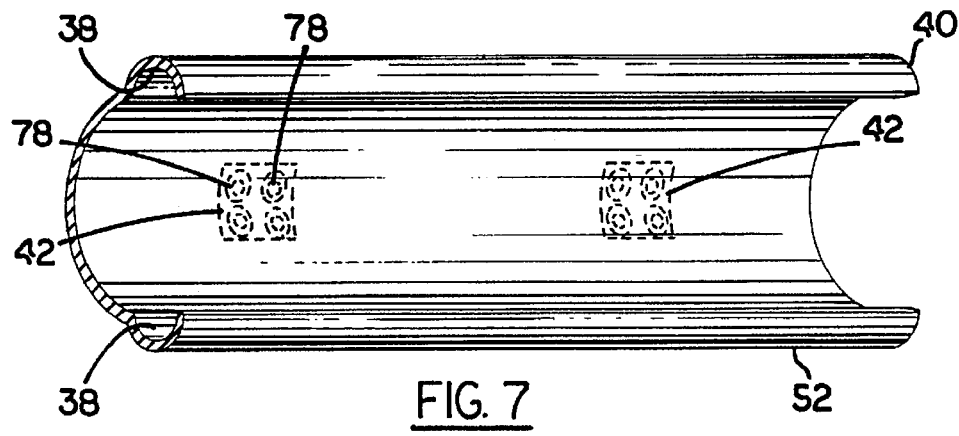
FIG. 7 is a front perspective view of the insert shell of FIG. 6.
Figure 8:
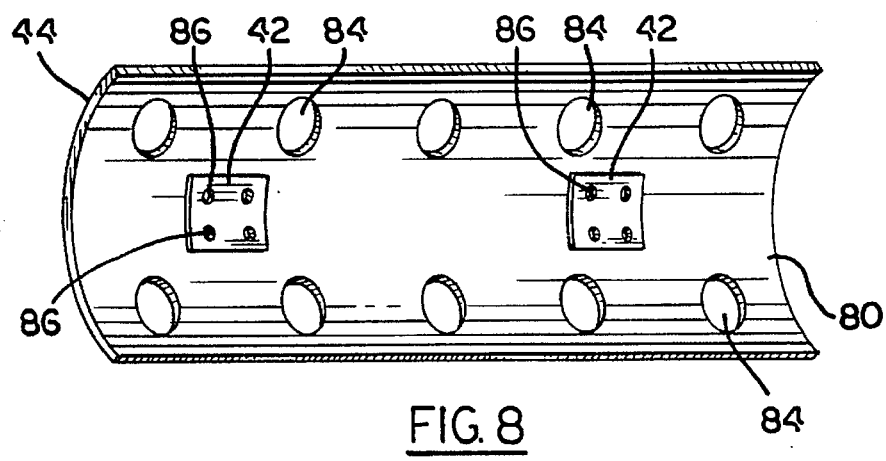
FIG. 8 is front perspective view of the impact support beam of FIG. 6.

Alternatively, as shown in FIGS. 6, 7, and 8, impact support beam 44 may be attached to the back 52 of insert shell 40 by two reinforcement plates 42 which are spot welded 78 to the front 80 of the beam and the back of the shell.

Threaded attachment means 86 are provided on the back of the reinforcement plates.

Alternatively, impact support beam 44 may be connected, bolted, or welded to the insert shell without direct attachment to reinforcement plates 42. This is done, for example by making the impact support beam shorter than the distance between the reinforcement plates, or making clearance openings in the impact support beam in order to clear the reinforcement plates, or by a vertical displacement between the impact support beam and the reinforcement plates.

Lightening holes 84 are included in support beam 44 to reduce weight.

Rear bumper system 21 further includes on each side of the car, a load transfer element such as wheel 50. Wheel 50 is mounted on bracket 66 which is attached to reinforcement plate 42 by bolts 70. Transfer wheel 50 is mounted on a rim 54 that is free to rotate on bearing 74.

Figure 9:
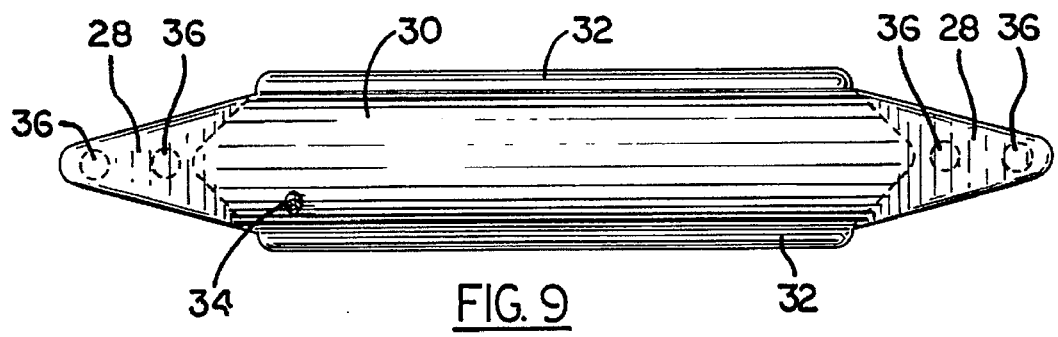
FIG. 9 is a front view of the inflatable bag of FIG. 5.
Figure 10:
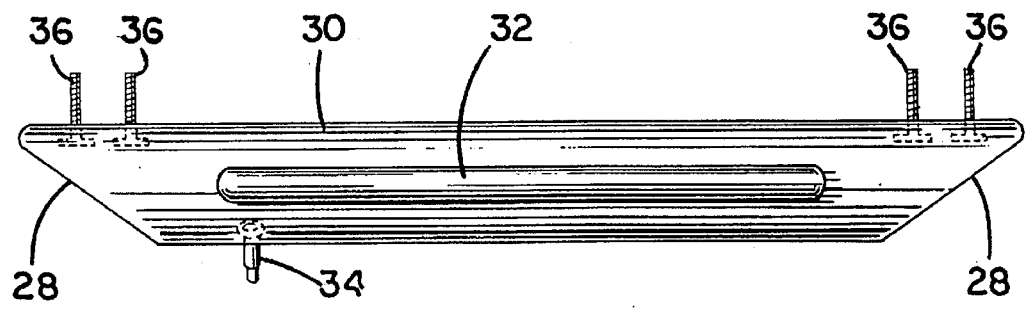
FIG. 10 is a top view of the inflatable bag of FIG. 5.
Figure 11:
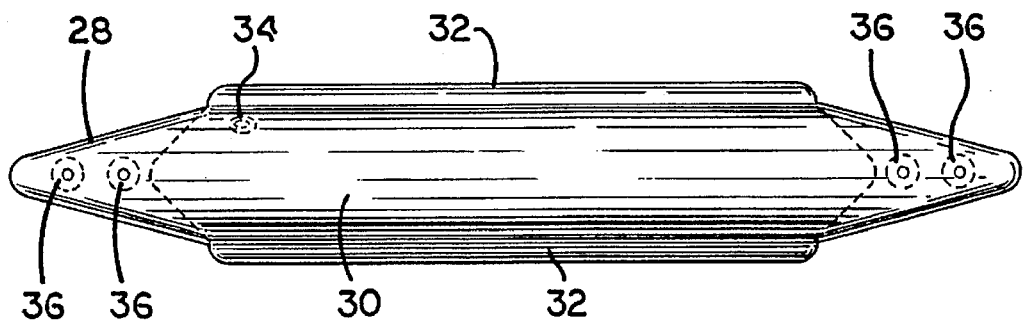
FIG. 11 is a rear view of the inflatable bag of FIG. 5.

FIGS. 9–11, inflatable bag 30 comprises a hollow elongated tube preferably made from reinforced rubber having the strength and durability of rubber used in the walls of car and truck tires.

Figure 3:
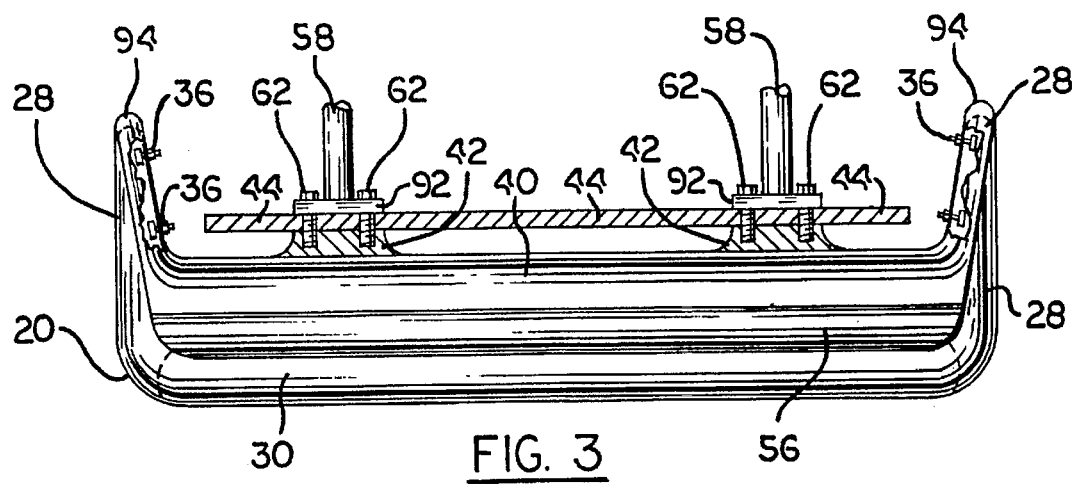
FIG. 3 is a bottom view of the bumper assembly on the front end of the car of FIG. 1.
Figure 4:
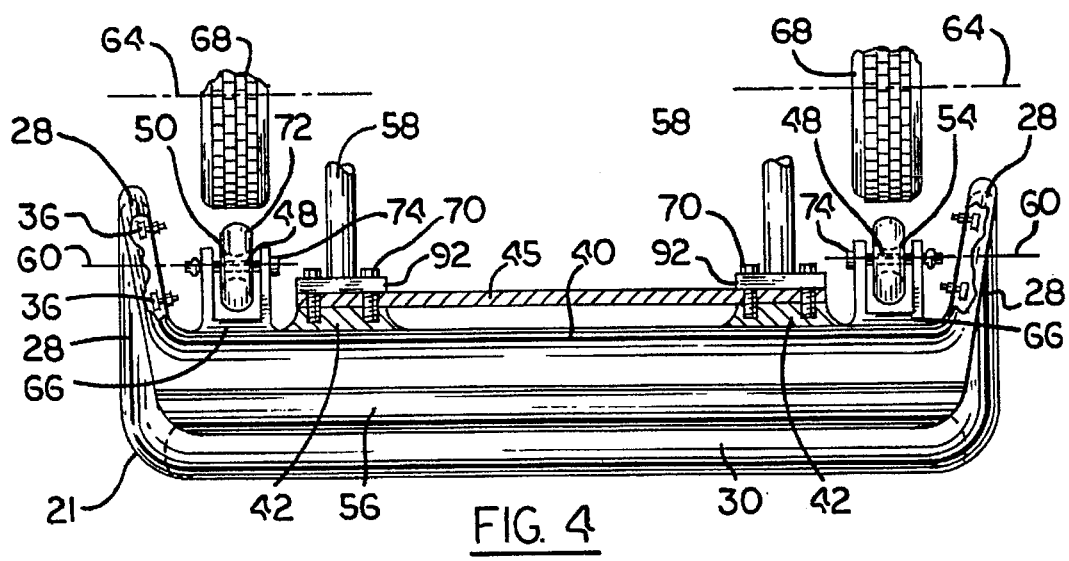
FIG. 4 is a bottom view of the bumper assembly on the back end of the car of FIG. 1, rotated 180 degrees for clarity.
Figure 5:
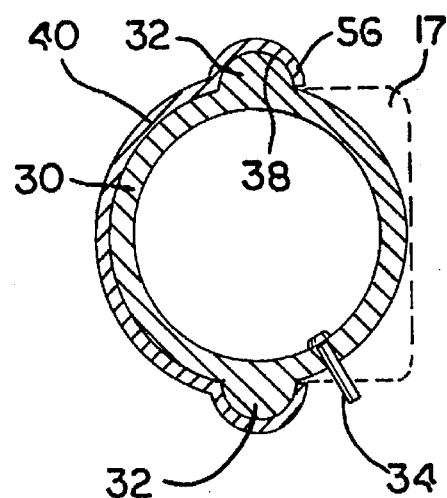
FIG. 5 is a cross section side view of part of a bumper assembly including an insert shell and inflatable bag.

Bolts 36 are molded into solid ends 28 of the inflatable bag, and attach the inflatable bag to insert shell 40 as shown in FIGS. 3 and 4.

Mounting the bumper system on a new vehicle, is quick and easy. At the front of the vehicle, bumper system 20 is attached to the shock absorbers by running bolts through shock absorber flanges 92, impact support beam 44, and reinforcement plate 42.

Insert shell 40 is U-shaped so that it wraps around the front of the vehicle. This provides very good impact protection against oblique hits on the vehicle, and provides support for a wrap around cover 17 for aesthetic value.

After insert shell 40 is installed on the vehicle, a deflated inflatable bag is installed in the concave front of the shell by setting it in the concavity and bolting it 36 to ends 94 of the insert shell. Then the inflatable bag is inflated by way of valve 34 until the ribs 32 are forced outward into the recess 38 of the longitudinal channels 56.

The ribs and recesses may be designed so that once they engage they interlock like the bead in a good tire, so that the inflatable bag is not dislodged by impacts. For this, the ribs may be solid, preferably rubber or elastomeric.

The same procedure is applied to mounting bumper system 21 at the rear of the vehicle, except that two brackets 66 for two transfer wheels 50 are also mounted on the back of the insert shell.

Advantages and benefits of the invention may also be provided for the side of a vehicle by bolting a straight insert shell to the side of the car.

The impact support beam is curved so that it provides back-up support for insert shell 40. When inflated bag 30 receives a localized impact normal to the length of the bag, the energy of impact is spread lengthwise in the fluid in the bag, and absorbed over the larger area of the walls of the bag and the wall of the insert shell.

The fluid may be a compressible fluid such as air or other gas, and the bag may be made with elastic walls such as rubber, so that the energy of impact is absorbed by the fluid and the walls of the bag.

If the impact falls to the left or right of a reinforcement plate, the insert shell may spring back toward the impact support beam which provides further support against the force of the impact, and keeps the insert shell from twisting.

The insert shell may also be made flexible enough to expand backwards under expanding force from the impacted inflatable bag until it is received by a stiffer impact support beam.

In the rear bumper system, FIG. 4, the transfer wheel 50 is spaced from adjacent rear wheel 68 of car 16, that is inward on the car with respect to the rear insert shell. Axis 60 of the transfer wheel is parallel with axis 64 of the car's wheel. The transfer wheel engages the rear wheel of the car when the portion of the insert shell to which the rear wheel is attached, moves inward on the car.

As the transfer wheel is under the car, generally out of sight, and inconvenient to reach to pressurize by pumping, the transfer wheel tire 72 is preferably a solid rubber or elastomeric material, such as a foam rubber requiring no maintenance or pumping.

Any rotatable element may be used in place of a wheel for transfer wheel 50, such as a large ball, which is free to rotate on axis 60.

Alternatively to installing the transfer wheel assembly on the rear bumper system, a front bumper system which has the wider impact beam may also be installed at the rear of the vehicle.

Installation of the invention on a vehicle is not limited to attachment to shock absorbers, nor are they required for operation of the invention. It is practical, however, to attach the invention to existing shock absorbers for ease of installation and for the added shock protection that they provide.

The insert shell and impact support beam may be designed to ultimately crush and sacrifice under high impact in order to provide further protection for the passengers and vehicle.

The bumper system is inexpensive to manufacture. The insert shell, impact support beams, reinforcement plates and brackets may be made of stamped and welded steel, and the inflatable bag and free wheels may be made from recycled elastomeric materials such as rubber tires.

From the foregoing, it is seen that with the present invention installed on a vehicle, the vehicle and passengers are protected from injury by shock and crushing, and from cost by collapsing of portions of the vehicle, by a bumper system which has many stages of protection.

For example, the bumper system spreads the force of impact sideways where much of the force is absorbed along the length and radially in all directions by the inflatable bag. Additional absorption of the force is taken radially by the insert shell along the length of the insert shell. Further absorption is taken by expansion of the insert shell, and further by movement of the shell to the impact support beam which adds further protection. At the back of the vehicle, further protection is provided by absorption of energy in the free wheels and the rear wheels of the vehicle, wherein that energy may have overwhelmed the inflatable bag, insert shell, and impact support beam.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

I claim:

1. A bumper system adapted to be mounted on a vehicle, said bumper system comprising:

a bag, being elongated, inflatable, having a length, a first end, a second end, a top, a bottom, a front, and a back, a shell, being elongated, having a length, a first end, a second end, a mid portion, a first side and a second side, said bag being inflated with a compressible fluid, a first longitudinal rib on the top of said bag spaced across the top of said bag laterally from the back of said bag, extending upward from said bag and along the length of said bag, said shell comprising a first U-shaped channel enclosing said first longitudinal rib between downward depending legs of said U, and a C-shaped channel having forward depending legs enclosing the back of said bag and attached by the forward end of one of the forward depending legs of the C to the lower end of one of the downward depending legs of the U.

2. The bumper system of claim 1, further comprising:

said mid portion of said shell being angled from said first end of said shell and from said second end of said shell, so that said shell wraps around an end of the vehicle when said mid portion is across an end of said vehicle, the ends of said bag being solid, said bag being filled by said compressible fluid and comprising fastener means at said solid ends for attaching said bag to said shell at the ends of said shell.

3. The bumper system of claim 2, further comprising:

a first impact support beam having a first end, a second end, a first side and a second side, and being connected to the second side of said shell, the first side of said shell facing the bag, said first impact support beam extending along the length of said shell and being rigidly attached to said shell.

4. The bumper system of claim 3, further comprising:

said first side of said impact support beam being concave and facing toward said second side of said shell and said bag.

5. The bumper system of claim 4, further comprising:

shell support attachment means attached to said shell and adapted to attach said shell to shock absorber bumper support means of a vehicle, said impact support beam being spaced from said insert shell by said shell support attachment means.

6. The bumper system of claim 5, further comprising:

said shell support attachment means comprising means for attaching said impact support beam to said shell.

7. The bumper system of claim 1, further comprising:

a rotatable transfer element connected to said shell, adapted for contact with a wheel of said vehicle, so that the axis of rotation of said rotatable transfer element is fixed parallel with the axis of rotation of the wheel of the vehicle when the shell is mounted on the vehicle.

8. The bumper system of claim 7, further comprising:

said rotatable transfer element being connected to said shell so that the circumference of said rotatable transfer element is adjacent to the circumference of said wheel of said vehicle.

9. The bumper system of claim 8, further comprising:

said rotatable transfer element comprising a generally solid tire.

10. The bumper system of claim 1, further comprising:

a second longitudinal rib on the bottom of said bag, spaced across the bottom of said bag laterally from the back of said bag, extending downward from said bag and along the length of said bag, said shell comprising a second U-shaped channel enclosing said second longitudinal rib between upward depending legs of the U of said second U-shaped channel, said C-shaped channel being attached by the forward end of the other leg of the C to the upper end of one of the upward depending legs of the second U-shaped channel.

11. The bumper system of claim 10, further comprising:

said inflated bag being generally circular in cross section, the first and second longitudinal ribs in the first and second U-shaped channels being opposed to one another across the center of the bag.

12. The bumper system of claim 1, further comprising:

a first impact support beam having a first end, a second end, a first side and a second side, and being connected to the second side of the shell, said first impact support beam extending along the length of the shell and being rigidly attached to the shell.

13. The bumper system of claim 12, further comprising:

shell support attachment means attached to said shell and adapted to attach said shell to shock absorber bumper support means of a vehicle, said shell support attachment means comprising means for attaching said impact support beam to said shell.

14. The bumper system of claim 13, further comprising:

said impact support beam being spaced from said insert shell by said shell support attachment means.

* * * * *